United States Patent
Tan

(10) Patent No.: US 6,926,037 B2
(45) Date of Patent: Aug. 9, 2005

(54) COLLAPSE TOLERANT FLEXIBLE PIPE AND METHOD OF MANUFACTURING SAME

(75) Inventor: Zhimin Tan, Kathy, TX (US)

(73) Assignee: Wellstream International Limited, Newcastle Upon Tyne (GB)

(*) Notice: Subject to any disclaimer, the term of this patent is extended or adjusted under 35 U.S.C. 154(b) by 0 days.

(21) Appl. No.: 10/321,084

(22) Filed: Dec. 17, 2002

(65) Prior Publication Data

US 2004/0112452 A1 Jun. 17, 2004

(51) Int. Cl.⁷ .................................................. F16L 11/00
(52) U.S. Cl. ........................ 138/124; 138/125; 405/43
(58) Field of Search .................................. 138/114, 123, 138/124, 125, 98; 405/43

(56) References Cited

U.S. PATENT DOCUMENTS

| | | | |
|---|---|---|---|
| 1,301,354 A | | 4/1919 | Baird |
| 4,153,080 A | | 5/1979 | Murray, Jr. et al. |
| 4,249,971 A | * | 2/1981 | Yap et al. ................. 156/143 |
| 4,450,873 A | * | 5/1984 | Sadler et al. .............. 138/174 |
| RE32,508 E | | 9/1987 | Feucht |
| 4,950,103 A | * | 8/1990 | Justice ..................... 405/43 |
| 5,056,282 A | * | 10/1991 | Pflieger .................... 52/514.5 |
| 5,868,169 A | * | 2/1999 | Catallo ..................... 138/98 |
| 6,016,845 A | * | 1/2000 | Quigley et al. ............ 138/125 |
| 6,158,476 A | * | 12/2000 | Sjotun ....................... 138/126 |
| 6,461,078 B1 | * | 10/2002 | Presby ...................... 405/49 |
| 6,508,276 B2 | * | 1/2003 | Radlinger et al. ......... 138/125 |
| 2002/0185188 A1 | * | 12/2002 | Quigley et al. ............ 138/137 |

FOREIGN PATENT DOCUMENTS

| | | |
|---|---|---|
| EP | 0 247 812 A2 | 12/1987 |
| GB | 1046073 | 10/1966 |
| GB | 1237097 | 6/1971 |
| GB | 2143002 | 1/1985 |

OTHER PUBLICATIONS

Patent Cooperation Treaty, International Search Report (European Patent Office), "Notification of Transmittal of The International Search Report or the Declaration," Jun. 23, 2004, 7 pages.

* cited by examiner

Primary Examiner—James Hook
(74) Attorney, Agent, or Firm—Klarquist Sparkman LLP

(57) ABSTRACT

A collapse tolerant flexible pipe and method of manufacturing same according to which an inner tubular layer is provided within an outer tubular layer in a coaxial relationship thereto. The inner layer maintains the maximum allowable strain on the outer layer below a value that will cause damage to the outer layer when the pipe collapses.

32 Claims, 2 Drawing Sheets

COLLAPSE TOLERANT FLEXIBLE PIPE AND METHOD OF MANUFACTURING SAME

BACKGROUND

Flexible pipes currently used in offshore oil and gas fields for the transport of fluids underwater between the subsea wellhead and the surface facilities are designed to retain a circular cross-section when subject to external hydrostatic pressure. This is usually achieved by the inclusion of metallic layers which extend around and support a polymer fluid barrier layer and which resists collapsing under the external hydrostatic pressure. However, for deep water applications, the strength and the weight of the metallic layers required to resist collapse becomes a limiting factor in flexible pipe design.

Also, in these designs the innermost barrier layer is designed to contain the fluid or gas. Thus, when the pipe collapses or is squashed, the barrier wall will experience excessive localized over-bending, which can cause structural damage to the barrier layer and result in failure of the pipe.

Therefore, what is needed is a flexible pipe that can tolerate relatively high hydrostatic pressure yet eliminate the disadvantages of the metallic layers discussed above while avoiding potential structural damage to the barrier layer.

DETAILED DESCRIPTION

Figure 1:
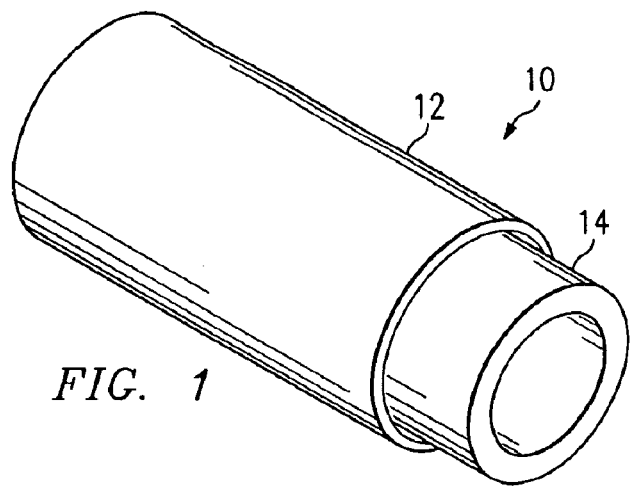
FIG. 1 is an isometric view of a pipe according to an embodiment of the invention.

Referring to FIG. 1 of the drawings, the reference numeral 10 refers, in general, to a pipe according to an embodiment of the invention. The pipe 10 is designed to receive a fluid at one end for the purpose of transporting the fluid. The pipe 10 includes a barrier layer 12 and an inner layer 14 disposed within the barrier layer in a coaxial relation thereto, with the inner layer normally conforming to the corresponding inner surface of the barrier layer in an abutting relationship, for the entire length of the latter layer.

The barrier layer 12 can be fabricated from a material that has reasonable ductility and elasticity such as a plastic or elastic polymer. The material forming the inner layer 14 can also be a plastic or elastic polymer, and preferably is selected so that it has sufficient ductility to survive after being subjected to large strain levels a number of times, and sufficient elasticity to tend to recover from a collapsed state when the pipe is repressurized.

The wall thickness of the inner layer 14 relative to the wall thickness of the layer 12 is selected so that damage to the barrier layer 12 is prevented when both the barrier layer and the inner layer are collapsed in response to a hydrostatic load placed on the pipe. For example, and assuming the layers 12 and 14 are fabricated from a polymer material as discussed above, their relatively thicknesses are selected so that, when the pipe 10 collapses under a hydrostatic load, a maximum strain on the layer 12 will occur that is no greater than approximately 7% which is below the value that will cause damage to the barrier layer for most polymer material. Thus, the thickness of the inner layer 14 relative to the thickness of the layer 12 is selected to limit the bending of the outer layer to within safe levels of strain. In this context, it is understood that the thickness of the inner layer 14 relative to the barrier layer 12 can vary from a value in which the former is less or greater than the latter based on the relative dimensions of the layers 12 and 14 and the material of the layers. Thus, the relative thicknesses of the layers 12 and 14 shown in the drawing are for the purposes of a non-limitative example only.

Figure 2A:
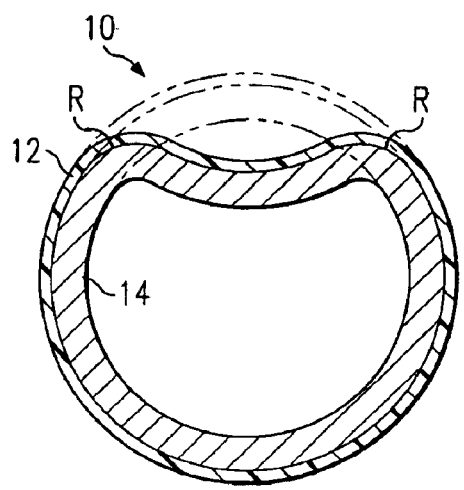
FIGS. 2A, 2B, 3 and 4 are enlarged transverse sectional views of the pipe of FIG. 1, depicting various collapsed modes.
Figure 2B:
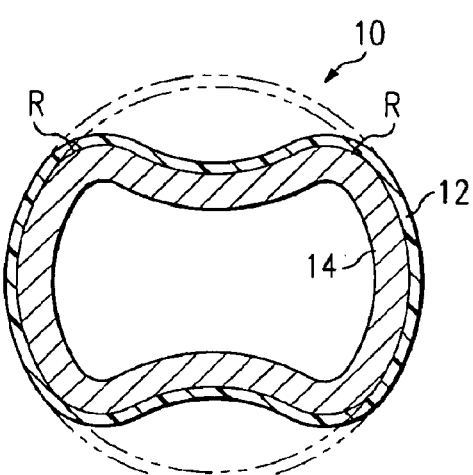

FIGS. 2A and 2B depict the pipe 10 after application of an external pressure to the barrier surface of the barrier layer 12 sufficient to collapse the pipe. In the case of FIG. 2A, one area of the pipe 10 has collapsed, whereas in FIG. 2B, diametrically opposite portions have collapsed. In both cases, the outer radius R of the inner layer 14 forms a cushion that limits the bending of the barrier layer 12 at an area where the maximum strain on the barrier layer normally occurs. The thickness of the inner layer 14 is selected so that the maximum possible bending of the barrier layer 12 is limited to an amount less than the bending that would cause strain on the barrier layer sufficient to damage it.

Figure 3:
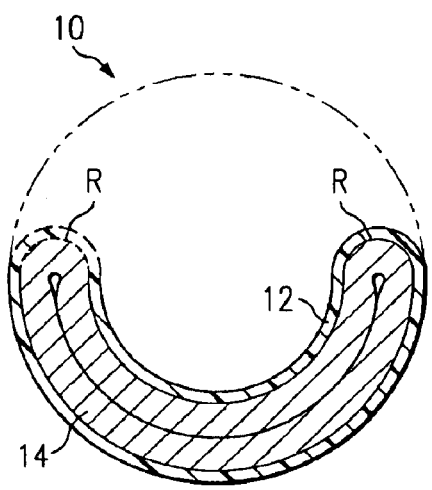

If the external pressure acting on the pipe 10 remains sufficiently high after the initial collapse shown in FIGS. 2A and 2B, then the pipe may be further forced into a post-buckled mode shown in FIG. 3. In this situation, one portion of the barrier layer 12 and the inner layer 14 (in the example shown, the upper halves of the layers) attain maximum deformation, and the collapse is such that the flow path through the inner layer 14 is completely closed. As in the situation of FIGS. 2A and 2B, the collapsed inner layer 14 forms a cushion with round radii R which limit the maximum possible bending of the barrier layer 12 and thus protect it from damage.

Figure 4:
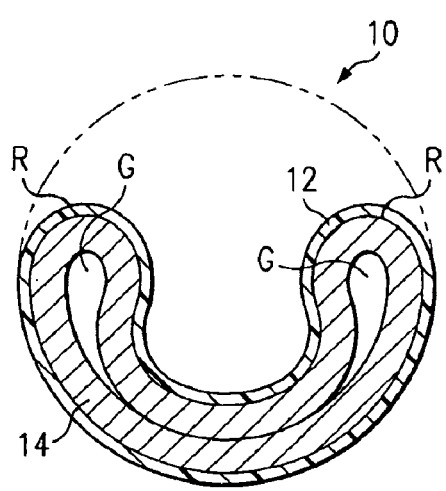

The collapse of the pipe 10 can also result in small gaps G at two ends of the cross section of the pipe, as shown in FIG. 4. As in the situation of FIGS. 2A and 2B, the collapsed barrier layer 12 and inner layer 14 form a cushion with round radii R where the maximum strain on the barrier layer occurs. However, due to the gaps G, the radii R will be greater than the radii R in the example of FIG. 3. As a result, relative lower strain is expected on the barrier layer 12. By taking this phenomenon into consideration, the relative thickness of the inner layer 14 (and therefore the ratio of the inner layer thickness over the thickness of the barrier layer 12) can be reduced from a value used when the gaps G are not present.

In each of these situations, the inner layer 14 can suffer localized structural damage, such as crazing or localized yielding, especially after several collapses, but this damage will not affect the function of the pipe and can be tolerated. When the inner layer 14 is, in fact, damaged, it functions as a sacrificial layer.

Figure 5:
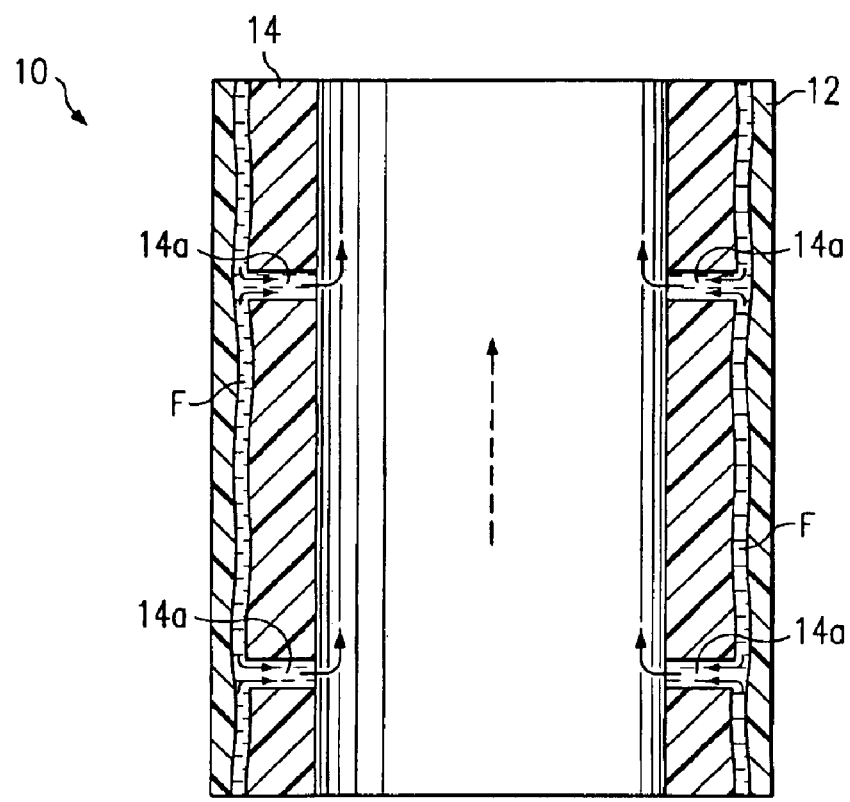
FIG. 5 is an enlarged longitudinal sectional view of the pipe of FIG. 1.

The accumulation of permeated fluid and/or gas in the interface between the barrier layer 12 and inner layer 14 can cause separation between the barrier layer 12 and inner layer 14 prior to collapse of the pipe 10. This separation could result in an undesirable collapse mode other than those shown in FIGS. 2 and 3 since the inner layer 14 may not be able to protect the barrier layer from over-bending and subsequent structural damage. A technique to eliminate this accumulation and thus to insure that the pipe 10 collapses properly to the collapse modes (shapes) shown in FIGS. 2 and 3 is depicted in FIG. 5.

Specifically, a series of small radially-extending and axially and angularly-spaced holes 14a are formed through the inner layer 14 in any known manner, such as by drilling. During operation, the holes 14a will promote the flow of the trapped fluid/gas from the interface F, and into the interior of the inner layer 14 as shown by the solid arrows. This is caused by two effects—a "vacuum" effect due to low pressure at the inner side of the holes 14a which is generated by the flowing fluid/gas inside the inner layer 14 in the direction shown by the dashed arrow, and a "squeezing" effect as the internal flow pressure (with possible external pressure on the outer surface of the inner layer 12) pushes the inner layer 14 and the barrier layer 12 against each other. This flow through the holes 14a avoids separation of the barrier layer 12 and inner layer 14 so that they will thus remain in contact in their designed, abutting, coaxial configuration, thus avoiding the undesirable separation and enabling the pipe 10 to return from its collapsed condition to its normal condition shown in FIG. 1.

The pipe 10 thus can tolerate relatively high hydrostatic pressures while eliminating the disadvantages of the metallic layers discussed above and avoiding potential structural damage to the barrier layer. In addition, the pipe 10 can be wound on a storage reel in a collapsed, substantially flat form, an advantage from a storage and transportation standpoint.

Figure 6:
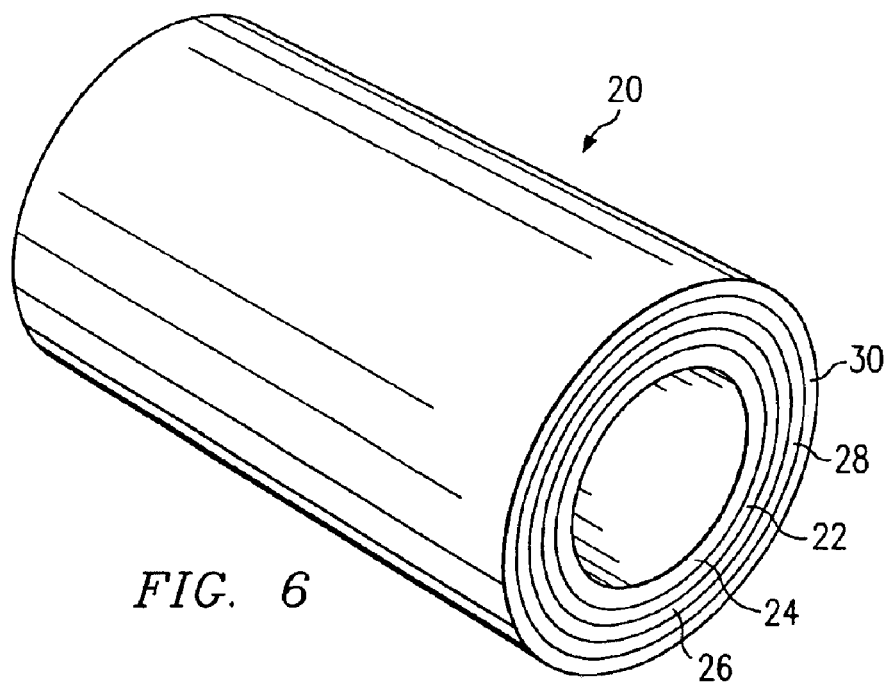
FIG. 6 is an isometric view of a pipe according to an alternate embodiment of the invention.

A pipe 20 according to an alternate embodiment is shown in FIG. 6 and is designed to receive a fluid at one end for the purposes of transporting the fluid. The pipe 20 includes a barrier layer 22 and an inner layer 24 which are identical to the barrier layer 12 and the inner layer 14, respectively, of the previous embodiment. Thus, the inner layer 24 is disposed in the barrier layer 22 in a coaxial relation thereto, with the inner layer normally conforming to the corresponding inner surface of the barrier layer in an abutting relationship, for the entire length of the barrier layer.

A protective layer 26 extends over the barrier layer 22, a reinforcement layer 28 extends over the protective layer 26 and an additional protective layer 30 extends over the layer 28. Although only one layer 26, 28, and 30 are shown, it is understand that additional layers 26, 28, and 30 can be provided. The protective layers 26 and 30 can be made from plastic or elastic polymer, or plastic or elastic polymer tapes with or without reinforcement fibers. The reinforcement layer(s) can be made from metallic or composite strips with or without interlocking.

The pipe 20 thus enjoys all of the advantages of the pipe 10 and, in addition, enjoys additional protection and reinforcement from the layers 26, 28, and 30.

It is understood that variations may be made in the foregoing without departing from the scope of the invention. For example, the pipe can be provided with one or more protective layers and/or one or more reinforcement layers extending over the outer layer.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A flexible pipe comprising an inner tubular layer defining a bore for the passage of fluid, and an outer tubular layer extending around the inner tubular layer in a coaxial relationship thereto, and a plurality of openings extending through the inner layer for permitting any fluids in the interface between the layers to pass to the bore, the thickness of the inner layer compared to that of the outer layer and the material of the inner layer being such that:

the maximum allowable strain on the outer layer is below a value that will cause damage to the outer layer when the pipe collapses; and the bending of the outer layer is limited to a value below the value that would cause damage to the outer layer when the pipe collapses.

2. The pipe of claim 1 wherein the outer radius of the inner layer forms a cushion that limits the bending of the outer layer at an area where the maximum strain on the outer layer normally occurs.

3. The pipe of claim 1 wherein the inner layer normally conforms to the corresponding inner surface of the outer layer in an abutting relationship.

4. The pipe of claim 1 wherein the collapse of the pipe places a strain on the inner layer that damages the inner layer.

5. The pipe of claim 1 further comprising at least one additional layer extending over the outer layer.

6. The pipe of claim 5 wherein the additional layer protects and/or reinforces the outer layer.

7. A method of manufacturing a flexible pipe comprising:

providing an inner tubular layer extending within an outer tubular layer in a coaxial relationship thereto and having a bore for passing fluid;

forming a plurality of openings through the inner layer for permitting any fluids in the interface between the layers to pass to the bore; and selecting the material and the thickness of the inner layer so that:

the maximum allowable strain on the outer layer is below a value that will cause damage to the outer layer when the pipe collapses; and the bending of the outer layer is limited to a value below the value that would cause damage to the outer layer when the pipe collapses.

8. The method of claim 7 further comprising forming a cushion by the inner layer that limits the bending of the outer layer at an area where the maximum strain on the outer layer normally occurs.

9. The method of claim 7 further comprising conforming the outer surface of the inner layer to the corresponding inner surface of the outer layer so that the surfaces extend in an abutting relationship.

10. The method of claim 7 further comprising designing the inner layer so that a collapse of the pipe places a strain on the inner layer that damages the inner layer, but prevents damage to the outer layer.

11. The method of claim 7 further comprising disposing at least one additional layer over the outer layer.

12. The method of claim 7 further comprising protecting the outer layer.

13. The method of claim 7 further comprising reinforcing the outer layer.

14. A flexible pipe comprising an inner tubular layer defining a bore for the passage of fluid, an outer tubular layer extending around the inner tubular layer in a coaxial relationship thereto, and a plurality of openings extending through the inner layer for permitting any fluids in the interface between the layers to pass to the bore, the thickness of the inner layer compared to that of the outer layer and the material of the inner layer being such that a collapse of the pipe places a strain on the inner layer that damages the inner layer, but prevents damage to the outer layer.

15. The pipe of claim 14 wherein the bending of the outer layer is limited to a value below the value that would cause damage to the outer layer when the pipe collapses.

16. The pipe of claim 14 wherein the outer radius of the inner layer forms a cushion that limits the bending of the outer layer at an area where the maximum strain on the outer layer normally occurs.

17. The pipe of claim 14 wherein the inner layer normally conforms to the corresponding inner surface of the outer layer in an abutting relationship.

18. The pipe of claim 14 further comprising at least one additional layer extending over the outer layer.

19. The pipe of claim 18 wherein the additional layer protects and/or reinforces the outer layer.

20. A method of manufacturing a flexible pipe comprising:

providing an inner tubular layer extending within an outer tubular layer in a coaxial relationship thereto and having a bore for passing fluid;

selecting the material of the inner layer and the thickness of the inner layer when compared to the thickness of the outer layer so that a collapse of the pipe places a strain on the inner layer that damages the inner layer, but prevents damage to the outer layer; and forming a plurality of openings through the inner layer for permitting any fluids in the interface between the layers to pass to the bore.

21. The method of claim 20 further comprising limiting the bending of the outer layer upon a collapse of the pipe to a value below the value that would cause damage to the outer layer.

22. The method of claim 20 further comprising forming a cushion by the inner layer that limits the bending of the outer layer at an area where the maximum strain on the outer layer normally occurs.

23. The method of claim 20 further comprising conforming the outer surface of the inner layer to the corresponding inner surface of the outer layer so that the surfaces extend in an abutting relationship.

24. The method of claim 20 further comprising disposing at least one additional layer over the outer layer.

25. The method of claim 20 further comprising protecting the outer layer.

26. The method of claim 20 further comprising reinforcing the outer layer.

27. A flexible pipe comprising an inner tubular layer defining a bore for the passage of fluid, an outer tubular layer extending around the inner tubular layer in a coaxial relationship thereto and forming an interface with the inner layer, and a plurality of openings extending through the inner layer and connecting the interface with the bore to permit any fluids in the interface to pass to the bore, wherein the bending of the outer layer is limited to a value below the value that would cause damage to the outer layer when the pipe collapses.

28. The pipe of claim 27 wherein the thickness of the inner layer compared to that of the outer layer and the material of the inner layer being such that a collapse of the pipe places a strain on the inner layer that damages the inner layer, but prevents damage to the outer layer.

29. The pipe of claim 27 wherein the outer radius of the inner layer forms a cushion that limits the bending of the outer layer at an area where the maximum strain on the outer layer normally occurs.

30. The pipe of claim 27 wherein the inner layer normally conforms to the corresponding inner surface of the outer layer in an abutting relationship.

31. The pipe of claim 27 further comprising at least one additional layer extending over the outer layer.

32. The pipe of claim 31 wherein the additional layer protects and/or reinforces the outer layer.

* * * * *